(12) United States Patent
Cho

(10) Patent No.: US 12,211,028 B2
(45) Date of Patent: Jan. 28, 2025

(54) CONTACTLESS PAYMENT KIOSK SYSTEM AND METHOD

(71) Applicant: Maya Labs, Inc., Sherman Oaks, CA (US)

(72) Inventor: Daniel Cho, Sherman Oaks, CA (US)

(73) Assignee: Maya Labs, Inc., Sherman Oaks (CA)

( * ) Notice: Subject to any disclaimer, the term of this patent is extended or adjusted under 35 U.S.C. 154(b) by 0 days.

(21) Appl. No.: 18/040,092

(22) PCT Filed: Aug. 2, 2021

(86) PCT No.: PCT/US2021/044149
§ 371 (c)(1),
(2) Date: Jan. 31, 2023

(87) PCT Pub. No.: WO2022/031584
PCT Pub. Date: Feb. 10, 2022

(65) Prior Publication Data
US 2023/0306406 A1   Sep. 28, 2023

Related U.S. Application Data

(60) Provisional application No. 63/061,409, filed on Aug. 5, 2020.

(51) Int. Cl.
*G06Q 20/32* (2012.01)
*G06Q 20/18* (2012.01)

(52) U.S. Cl.
CPC ......... *G06Q 20/3274* (2013.01); *G06Q 20/18* (2013.01)

(58) Field of Classification Search
CPC .......................... G06Q 20/3274; G06Q 20/18
See application file for complete search history.

(56) References Cited

U.S. PATENT DOCUMENTS

| | | |
|---|---|---|
| 2007/0078787 A1 | 4/2007 | Mersky |
| 2007/0181692 A1 | 8/2007 | Barkan |
| 2009/0177565 A1 | 7/2009 | Philyaw |
| 2012/0061462 A1 | 3/2012 | Shadwell, Jr. |
| 2014/0129440 A1 | 5/2014 | Smith |
| 2014/0143055 A1 | 5/2014 | Johnson |
| 2015/0058870 A1* | 2/2015 | Khanna .............. H04N 21/2542 725/1 |
| 2016/0110702 A1* | 4/2016 | Landers, Jr. ......... G07G 1/0054 705/17 |
| 2017/0148002 A1* | 5/2017 | Stock .................. G07F 17/0035 |

(Continued)

*Primary Examiner* — Scott C Anderson
(74) *Attorney, Agent, or Firm* — Riverside Law LLP

(57) ABSTRACT

A contactless payment system includes a kiosk having a display, a payment collection module and a code input module and a controller configured to communicate with the kiosk and a mobile device. The controller is configured to receive a payment transaction instruction from the mobile device, generate a transaction code for display on the mobile device corresponding to the payment transaction instruction, send the transaction code to the mobile device, receive code data generated by the kiosk of the transaction code displayed on the mobile device, receive a payment confirmation from the kiosk, and determine whether the transaction is complete based on the received code data generated by the kiosk and the payment confirmation. A method for contactless payment is also disclosed.

23 Claims, 14 Drawing Sheets

(56) References Cited

U.S. PATENT DOCUMENTS

2018/0137535 A1\* 5/2018 Koenig .................. A63F 13/61
2019/0087802 A1   3/2019 Perkins
2019/0122222 A1\* 4/2019 Uechi ................... G06Q 20/42
2019/0318382 A1\* 10/2019 Yang .................... G06Q 20/326

\* cited by examiner

| Step | Picture |
|---|---|
| 1. Customer launches the cell phone app and logs in. | Sign in / Enter your PIN Code / •••• / CONFIRM / Reset PIN Code / [keypad 1-9, 0] |
| 2. Customer is presented with the transactions he/she made before. The screen on the right shows that, customer sent money to Mexico and paid a Timer Warner bill. Customer can choose to make the payment again by clicking on an item in the "Payment history" box. | Jockie Doe / Maya s, Products, Locations / Your History / Sent Money to ../$28.50 Paying/May 03 2021 PayAgain / Time Warner C../$28.50 Paying/May 03 2021 PayAgain |

FIG. 4A

3. Or the customer can make a new payment by clicking on the Products button to bring up the menu of services we offer.

4. Customer chooses the payment amount. In the example below, the customer is sending $50 to Mexico.

| | |
|---|---|
| 5. The payment is in the shopping cart. |  |
| 6. Customer walks up to the kiosk and brings up the QR code by clicking on the QR code icon on the cell phone app. |  |
| 7. QR code reader on the kiosk reads the QR Code on the cell phone app. |  |

| | |
|---|---|
| 8. The kiosk prompts the customer to put cash in. |  |
| 9. Customer puts the cash into the kiosk. |  |
| 10. Transaction is complete. Customer has a text receipt as well as the paper receipt from the kiosk. |  |

| Step | Picture |
|---|---|
| 1. Customer launches the cell phone app and takes a picture of the check. Customer submits the check for verification. |  |
| 2. Check is reviewed by an automated syste or by a human being. If the check is approved, the customer gets the message on the right. |  |
| 3. Customer walks up to the kiosk to scan the QR code. |  |

| | |
|---|---|
| 4. Customer is prompted to insert the check into the kiosk. | Insert your check Back<br>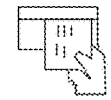<br>Back |
| 5. The customer inserts the check into the kiosk. Maya's software verifies the scanned check is the same check the customer got approved from the cell phone app. | 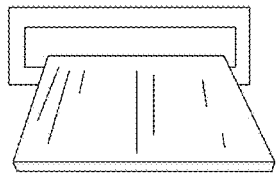 |
| 6. If the scanned check at the kiosk is the same check the customer submitted with his/her cell phone app. cash is dispensed. If not, the check is rejected | 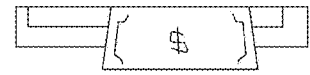 |
| 7. Transaction is complete. Customer gets a text receipt as well as the paper receipt from the kiosk | 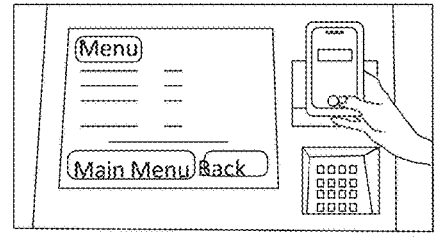 |

FIG. 4F

CONTACTLESS PAYMENT KIOSK SYSTEM AND METHOD

CROSS-REFERENCE TO RELATED APPLICATIONS

This application is a U.S. national stage filing of international application No. PCT/US21/44149 filed on Aug. 2, 2021, which claims priority to U.S. provisional application No. 63/061,409 filed on Aug. 5, 2020, both of which are incorporated herein by reference in their entireties.

BACKGROUND OF THE INVENTION

Financial institutions and billers that collect customer payments use various types of technology to increase efficiency and improve customer relations. Self-serve kiosks and mobile technology are popular tools for providing convenient access to deposit and withdraw money, access account information and perform various other tasks related to customer accounts with billers or financial institutions. Going to traditional brick and mortar facilities such as a local bank or biller branch often involves traveling to that location, standing in line, and doing so only when the facility is open. Self-serve kiosks provide more flexibility for location, accessibility, and typically don't require long waits in line (or any wait at all), and can typically handle the most routine tasks performed at a traditional bank branch or a money service business such as a check cashing store quickly and with high accuracy. Reducing the time it takes to complete a transaction also reduces the risk of exposure to pathogens. These self-serve kiosks can also provide an additional source of revenue for retailers, financial institutions, and billers, which does not require much of the overhead expenses required by a traditional bank branch or brick and mortar location. For technology savvy customers, they often prefer the convenience and improved accessibility that mobile and self-serve banking and bill payment offers.

Self-serve kiosks are typically in public spaces and require manual touching of screens or buttons for selecting user inputs. Certain "touch surfaces" or "contact surfaces" may naturally be touched at a higher frequency than other areas of the apparatus. Such touch surfaces are often easily contaminated and may represent vectors for contamination that can lead to the spread of disease through contact transference of contamination. For example, viruses such as Influenza and SARS-COV-2 may be transferred to such touch surfaces, and then transmitted to the next person in contact with the touch surface.

Self-serve kiosk surfaces are in many cases cleaned infrequently, touched numerous times at different areas by users, sometimes touched by people not intending to access the machine at all, and otherwise are a surface that can collect biological projectiles from the mouth and nose of people nearby, all of which are contributing to spread of viruses such as Covid-19, superbugs, and other surface-transmitted pathogens. It is estimated by the US Center for Disease Control (CDC) that Influenza viruses affect 5% to 20% of the U.S. population each year, and novel viruses can affect the population at much higher rates. Corona viruses such as Covid-19 may transfer from a contaminated touch surface and enter one's body when hands that have previously touched an infected surface also touch the mouth, nose, eyes or other vulnerable areas of entry on the human body.

Thus, there is a need in the art for self-serve payment kiosks to offer hygienic access that is simple to use and minimizes the spread of pathogens through surface contamination between uses.

SUMMARY OF THE INVENTION

A contactless payment system includes a kiosk comprising a display, a payment collection module and a code input module, and a controller configured to communicate with the kiosk and a mobile device. The controller is configured to receive payment transaction instructions from a mobile device, generate a transaction code for display on the mobile device corresponding to the payment transaction instructions, send the transaction code to the mobile device, receive code data generated by the kiosk of the transaction code displayed on the mobile device, receive a payment confirmation from the kiosk, and determine whether the transaction is complete based on the received code data generated by the kiosk and the payment confirmation. In one embodiment, the transaction code is generated for a third-party biller looking to collect payment from a customer; the third party sends the customer to the kiosk to finalize payment. In one embodiment, the display is optional, and all visual interactions happen on the customer's phone. In one embodiment, the controller comprises an application program interface (API) residing on a remote server. In one embodiment, the code input module is a scanner. In one embodiment, the code input module is an imaging device. In one embodiment, the imaging device is a camera. In one embodiment, the code input module is a microphone. In one embodiment, the payment collection devices are cash acceptors or cash recyclers (paper bills and/or coins). In one embodiment, the payment transaction instruction comprises one or more of user data, payment amount data, biller data, payor data, payee data, and invoice data. In one embodiment, the payment transaction instruction comprises all of user data, payment amount data, biller data and invoice data. In one embodiment, the transaction code displayed on the mobile device comprises a quick response (QR) code. In one embodiment, the transaction code displayed on the mobile device comprises an alphanumeric code. In one embodiment, the transaction code displayed on the mobile device comprises an audible code. In one embodiment, the transaction code displayed on the mobile device is a bar code. In one embodiment, the transaction code displayed on the mobile device is encoded in an image. In one embodiment, the transaction code displayed on the mobile device is encoded in a video. In one embodiment, the controller is configured to generate a receipt to indicate that the transaction is complete. In one embodiment, a contactless transaction system includes a kiosk comprising a token capture module, and a controller configured to communicate with the kiosk and a mobile device, the controller configured to receive a transaction instruction from the mobile device, generate a token for display on the mobile device corresponding to the transaction instruction, send the token to the mobile device, receive code data generated by the kiosk based on the token displayed on the mobile device, receive a transaction confirmation from the kiosk, and determine whether the transaction is complete based on the received code data generated by the kiosk and the transaction confirmation. Thus, embodiments of the system can include payors making remittances to payees, such as tenants making payments to landlords for rent payment. In certain embodiments, the system can dispense cash for applications like check cashing or micro loans. Thus, a biller can in certain embodiments by any entity receiving funds, or in other embodiments may be an entity distributing funds (for example a system partner that needs to dispense cash to a customer for refunds or any other type of compensation).

A method for contactless payment including receiving a payment transaction instruction from a mobile device, generating a transaction code for display on the mobile device corresponding to the payment transaction instruction, sending the transaction code to the mobile device, receiving code data generated by a kiosk of the transaction code displayed on the mobile device, receiving a payment confirmation from the kiosk, and determine whether the transaction is complete based on the received code data generated by the kiosk and the payment confirmation. In one embodiment, the code data is collected by a scanner. In one embodiment, the code data is collected by an imaging device. In one embodiment, the code data is collected by a camera. In one embodiment, the code data is collected by a microphone. In one embodiment, the payment confirmation is generated by the remote server and displayed to the customer on the kiosk. In one embodiment, the method includes the step of generating a receipt to indicate that the transaction is complete.

BRIEF DESCRIPTION OF THE DRAWINGS

The foregoing purposes and features, as well as other purposes and features, will become apparent with reference to the description and accompanying figures below, which are included to provide an understanding of the invention and constitute a part of the specification, in which like numerals represent like elements, and in which:

FIG. 4A is a flowchart depicting steps in a money transfer/bill payment transaction according to one example.

FIG. 4F is a flowchart depicting steps in a check cashing transaction example according to one example.

DETAILED DESCRIPTION OF THE INVENTION

Figure 1A:
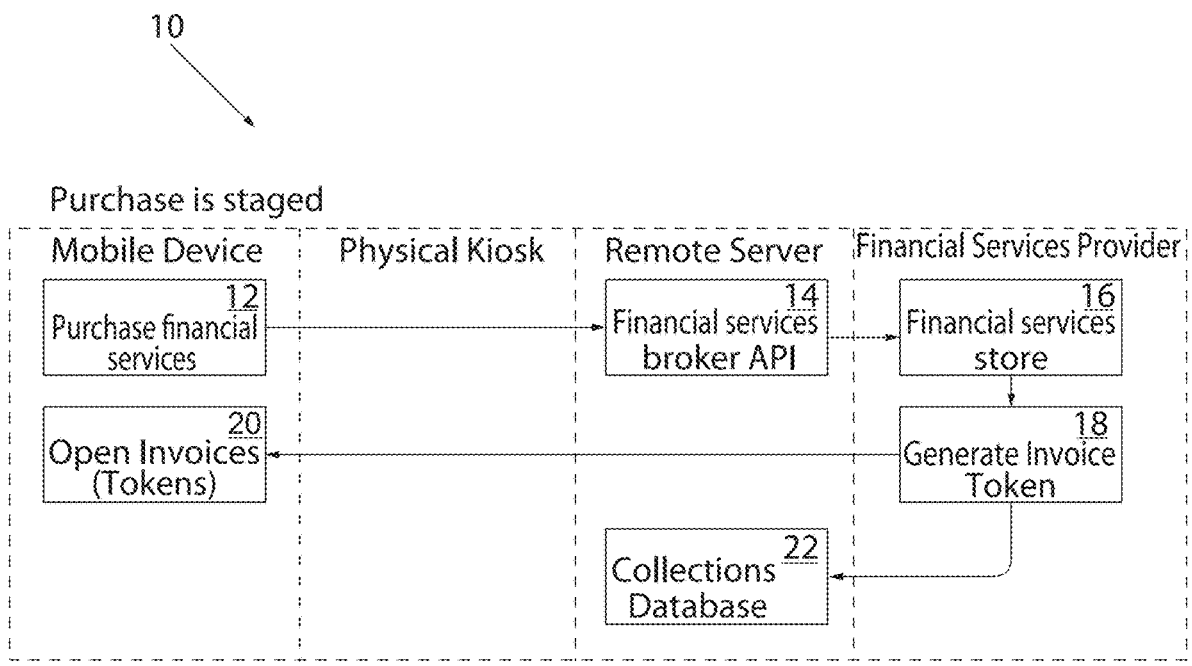
FIG. 1A is a swim lane diagram of a method for staging contactless payments according to one embodiment.

It is to be understood that the figures and descriptions of the present invention have been simplified to illustrate elements that are relevant for a clearer comprehension of the present invention, while eliminating, for the purpose of clarity, many other elements found in payment kiosk systems and methods of payment collection. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Where appropriate, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Referring now in detail to the drawings, in which like reference numerals indicate like parts or elements throughout the several views, in various embodiments, presented herein is a contactless payment kiosk system and method.

Embodiments of the system and method described herein allows any biller to collect cash payments through self-service kiosk. The biller's mobile software application communicates with a controller, which in certain embodiments is a centralized application program interface (API) running on a remote server to accept cash payments from the kiosk.

Figure 1B:
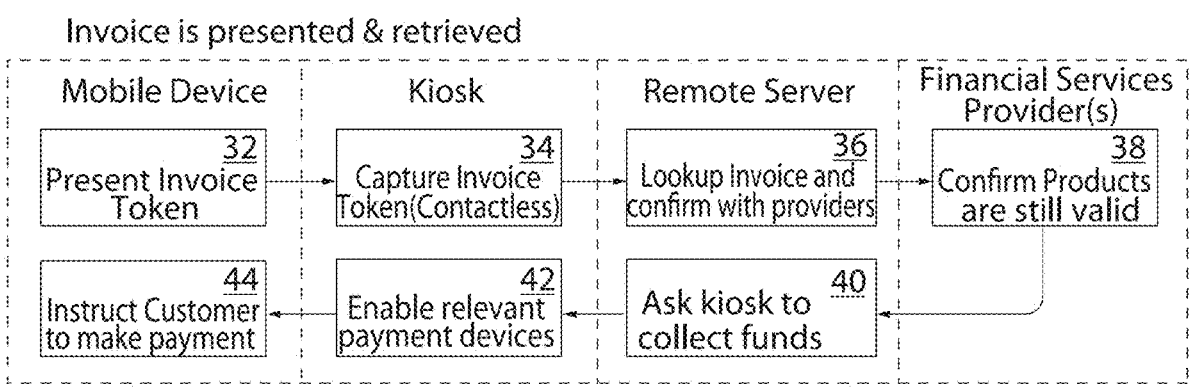
FIG. 1B is a swim lane diagram of a contactless payment system initiating a contactless payment according to one embodiment.
Figure 1C:
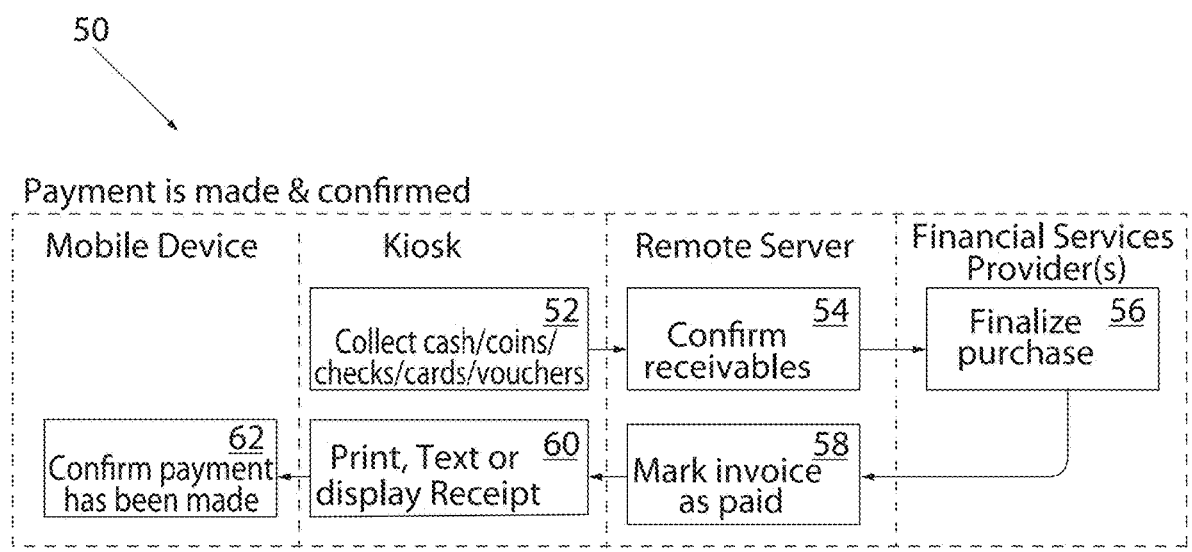
FIG. 1C is a swim lane diagram of a contactless payment system finalizing payment of an invoice according to one embodiment.

FIGS. 1A-1C show, according to one embodiment, steps for staging a purchase 10, presenting and receiving an invoice 30, and making payment with confirmation 50. With reference to the diagram in FIG. 1A, in one embodiment, a purchase is staged beginning with a purchase of financial services 12 at a mobile device, which is communicated with a financial services broker API 14 located on a remote server. The financial services provider 16 will generate an invoice token 18, and an invoice based on the token is presented at the mobile device 20 and in parallel referenced at the collections database 22. With reference to FIG. 1B, in one embodiment, an invoice is presented and retrieved 30. A present invoice token 32 is generated on a mobile device and transmitted to a kiosk by contactless method 34 as described in more detail below. A remote server finds the invoice and confirms with the financial service provider 36. The financial service provider confirms the product is still valid 38 and via the remote server asks the kiosk to collect funds 40. The kiosk enables the relevant payment device 42 and instructs the customer to make payment 44. With reference to FIG. 1C, payment is made and confirmed 50 according to one embodiment. A kiosk collects payment 52, which can be for example cash, coins, checks, cards, and vouchers. The remote server confirms receivables 54 and the financial services provider finalizes the purchase 56. The remote server marks the invoice as paid 58, and the kiosk prints, texts or otherwise displays a receipt 60. The mobile device confirms payment has been made 62.

Figure 1D:
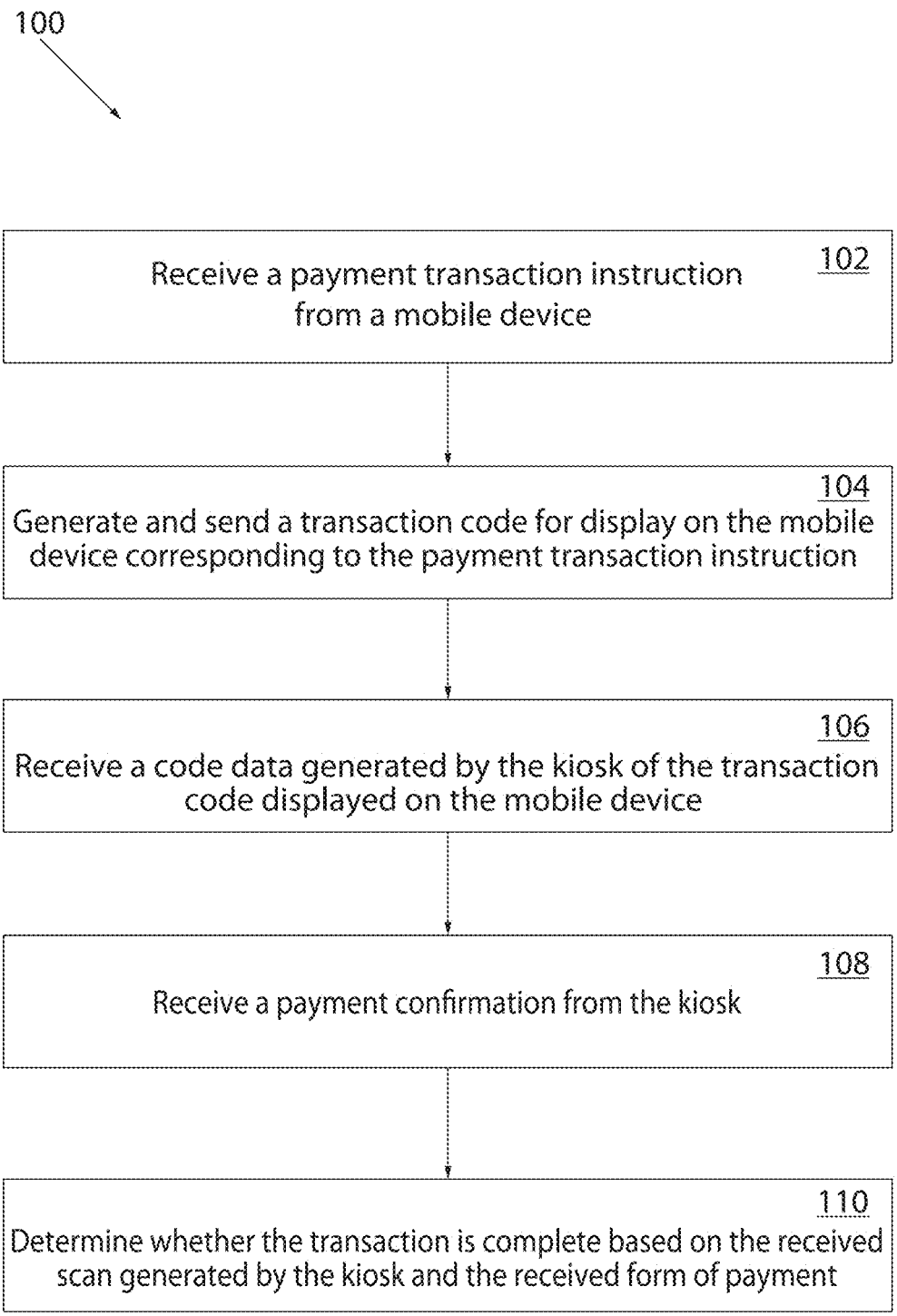
FIG. 1D is a flow chart of a method for contactless payment according to one embodiment.

With reference now to FIG. 1D, a method 100 for payment collection is now described according to one embodiment. An application program interface received a payment transaction instruction from a mobile device 102. The payment instruction can for example be generated by an app running on the mobile device. The payment instruction can include data for the intended transaction, such as user account number assigned by the biller, a user password or pin number, an invoice number related to the user account, the amount of money that the user intends to send the biller for the invoice, an account at the financial institution that some or all of the payment should be drawn from, and other preferences such as what form of receipt the user prefers for documenting the transaction outcome.

The application program interface then generates a transaction code and sends the transaction code to the user's mobile device for display on the mobile device screen and sends it to the mobile device 104. The transaction code can be for example a quick response code (QR code), an alphanumeric code, a barcode, an image, a video, an audio code, a combination of these code types or other types of codes known in the art. The code is compatible with output options on the user's mobile device, such as a screen display or a speaker.

The kiosk can include a scanner or imaging element for receiving the code as input. The user presents the code to a touch-free code input module, such as within a cavity or otherwise in proximity of a scanner, microphone or imaging element (depending on the type of code utilized by the system), and the touch-free code input module receives the code and sends it to the application program interface to reconcile with the transaction code 106.

Next, the kiosk can prompt payment from the user, and the user provides a form of payment 108. The form of payment can include for example one or more of inserting cash, payment by digital currency, payment card, payment voucher, or payment from a particular account at a financial institution associated with the user.

Finally, the application program interface determines whether the transaction is complete based on reconciling or comparing the received scan generated by the kiosk and the received form of payment 110. If there is an error, the user can be alerted by the kiosk and/or their mobile device, and the error can include information regarding the nature of the error and instructions for next steps to fix the error. If there is no error, the system can provide an indication that the transaction is complete, and a receipt (hard copy or digital) can be provided.

Figure 2A:
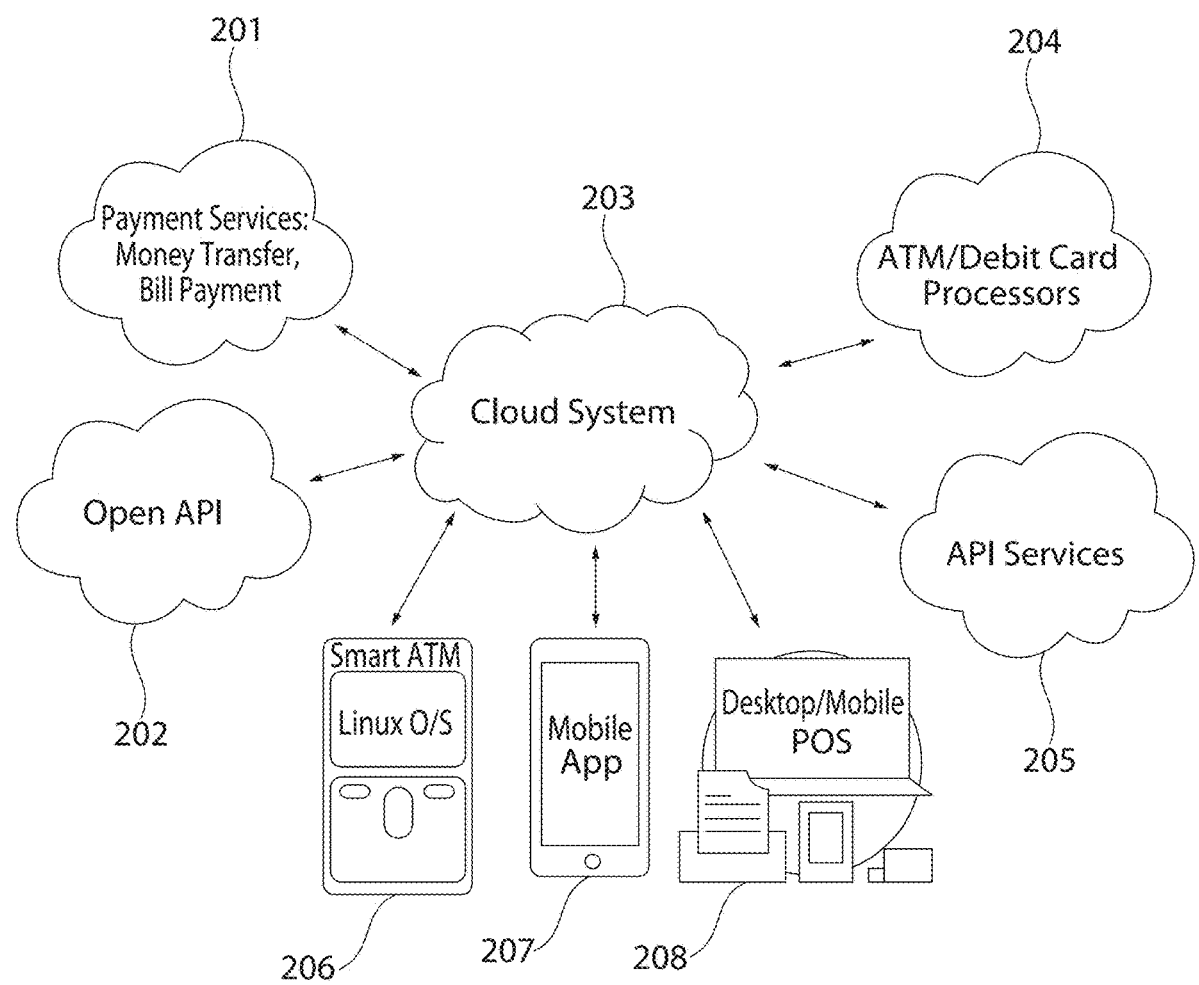
FIG. 2A is a diagram of a contactless payment system initiating a contactless payment according to one embodiment.
Figure 2B:
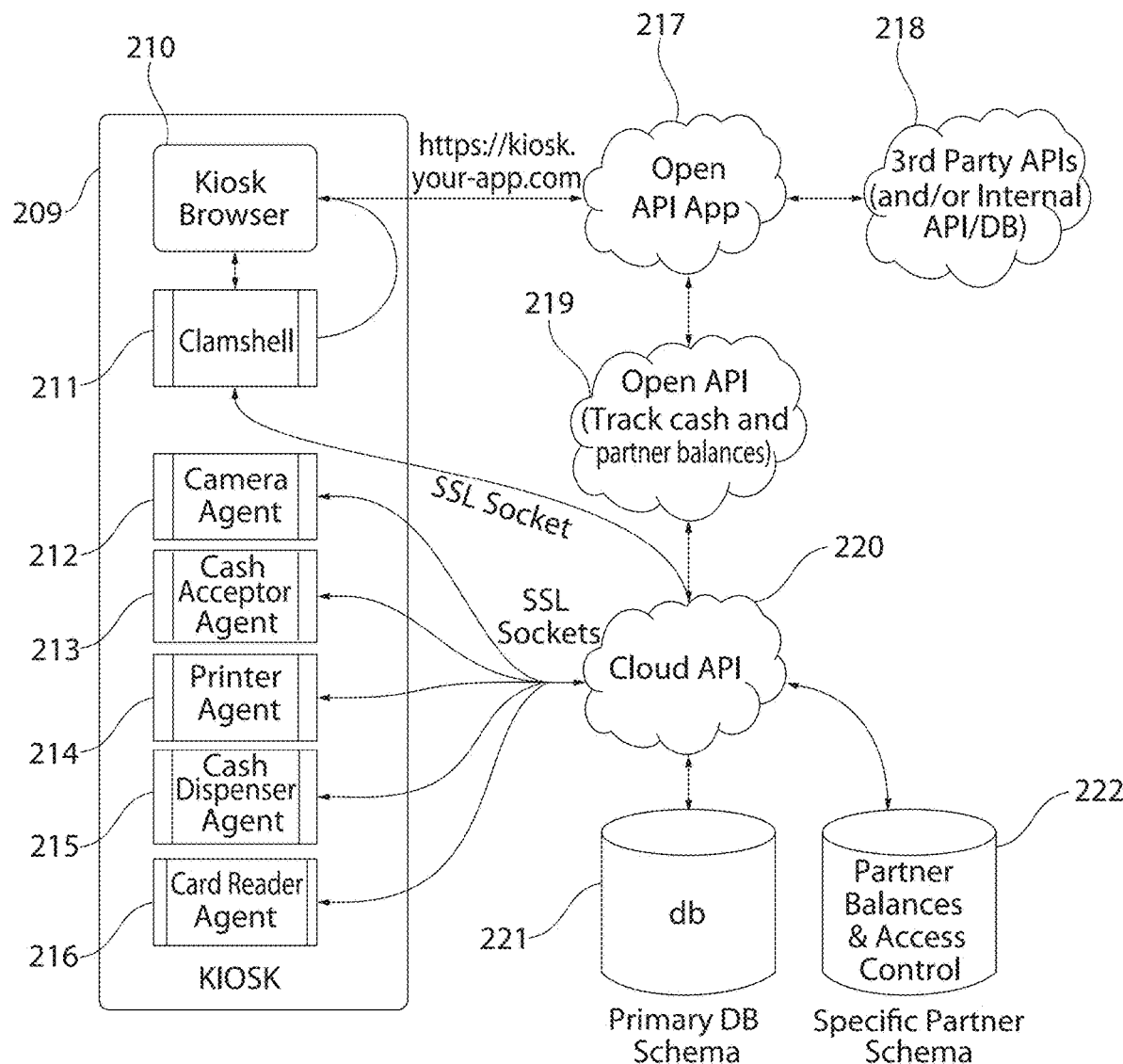
FIG. 2B is a diagram of an application program interface (API) according to one embodiment.
Figure 2C:
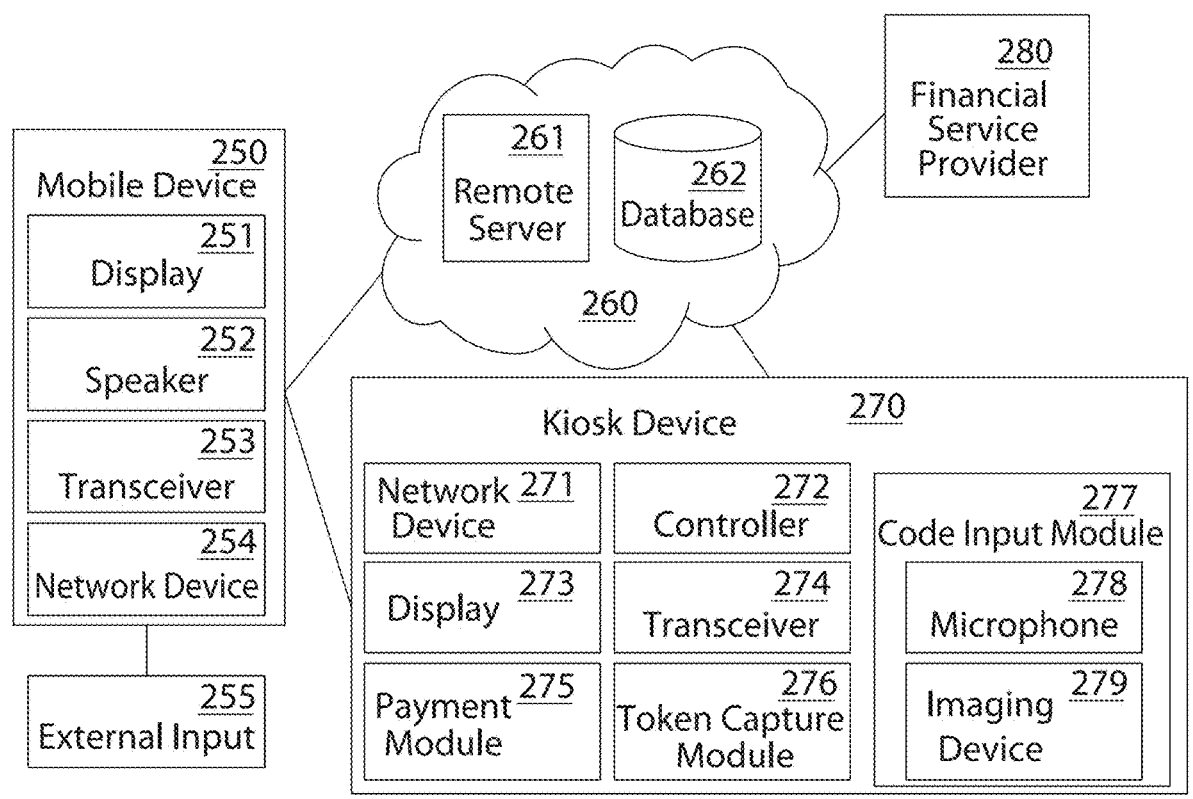
FIG. 2C is a system level block diagrams depicting a contactless payment system according to some embodiments.

Now with reference to FIGS. 2A, 2B, and 2C, a contactless payment kiosk system 250 and method according to one embodiment can execute the method and algorithms for contactless payment on a computer platform which can include one or more local or remote executable software platforms, mobile device platforms, or a hosted Internet or network program or portal. In one embodiment, only portions of the system are computer operated, and in other embodiments, the entire system is computer operated. Any computing device as would be understood by those skilled in the art may be used with the system, including desktop or mobile devices, laptops, desktops, tablets, smartphones or other wireless digital/cellular phones, or other thin client devices as would be understood by those skilled in the art. The contactless payment kiosk platform is fully integrable for use with any additional platform and data output that may be used for communicating with other platforms, such as for example financial institution platforms, user information platforms, cyber security platforms and payment collection platforms.

For example, the computer operable components of the contactless payment kiosk system may reside entirely on a single computing device or may reside on a central server and run on any number of end-user devices via a communications network. The computing devices may include at least one processor, standard input and output devices, as well as all hardware and software typically found on computing devices for storing data and running programs, and for sending and receiving data over a network, if needed. If a central contactless payment kiosk server is used, it may be one server or, more preferably, a combination of scalable servers, providing functionality as a network mainframe server, a web server, a mail server, and central database server, all maintained and managed by an administrator or operator of the system. The computing devices may also be connected directly or via a network to remote databases, such as for additional storage backup, and to allow for the communication of files, email, software, and any other data formats between two or more computing devices, such as between the contactless payment kiosk system, a user mobile device, biller systems and financial institution platforms. There are no limitations to the number, type or connectivity of the databases utilized by the contactless payment kiosk system. The communications network can be a wide area network and may be any suitable networked system understood by those having ordinary skill in the art, such as, for example, an open, wide area network (e.g., the Internet), an electronic network, an optical network, a wireless network, a physically secure network or virtual private network, and any combinations thereof. The communications network may also include any intermediate nodes, such as gateways, routers, bridges, Internet service provider networks, public-switched telephone networks, proxy servers, firewalls, and the like, such that the communications network may be suitable for the transmission of information items and other data throughout the system.

Further, the communications network may also use standard architecture and protocols as understood by those skilled in the art, such as, for example, a packet switched network for transporting information and packets in accordance with a standard transmission control protocol/Internet protocol ("TCP/IP"). Additionally, the system may utilize any conventional operating platform or combination of platforms (Windows, Mac OS, Unix, Linux, Android, etc.) and may utilize any conventional networking and communications software as would be understood by those skilled in the art.

To protect data, such as sensitive user financial and personal identification data, and to comply with state and federal laws pertaining to protection of financial and personal identification data, an encryption standard may be used to protect files from unauthorized interception over the network. Any encryption standard or authentication method as may be understood by those having ordinary skill in the art may be used at any point in the system of the present invention. For example, encryption may be accomplished by encrypting an output file by using a Secure Socket Layer (SSL) with dual key encryption. Additionally, the system may limit data manipulation, or information access. For example, a system administrator may allow for administration of the contactless payment kiosk platform at one or more levels, such as at an individual reviewer, a review team manager, a quality control review manager, or a system manager. A system administrator may also implement access or use restrictions for users at any level. Such restrictions may include, for example, the assignment of usernames and passwords required for use of the contactless payment kiosk, backend administrative access, associated mobile device apps, or the selection of one or more data types that the subservient user is allowed to view or manipulate.

As described in further detail herein, the payment system may operate as application software, which may be managed by a local or remote computing device. The software may include a software framework or architecture that optimizes ease of use of at least one existing software platform, and that may also extend the capabilities of at least one existing software platform. The application architecture may approximate the actual way users organize and manage electronic files, and thus may organize use activities in a natural, coherent manner while delivering use activities through a simple, consistent, and intuitive interface within each application and across applications. The architecture may also be reusable, providing plug-in capability to any number of applications, without extensive re-programming, which may enable parties outside of the system to create components that plug into the architecture. Thus, software or portals in the architecture may be extensible and new software or portals may be created for the architecture by any party.

The system may provide payment software applications accessible to one or more users, such as different users associated with a single biller or financial institution to perform one or more functions. Such applications may be available at the same location as the user, or at a location remote from the user. Each application may provide a graphical user interface (GUI) for ease of interaction by the user with information resident in the system. A GUI may be specific to a user, set of users, or type of user, or may be the same for all users or a selected subset of users. The system software may also provide a master GUI set that allows a user to select or interact with GUIs of one or more other applications, or that allows a user to simultaneously access a variety of information otherwise available through any portion of the system.

The system software may also be a portal or SaaS that provides, via the GUI, remote access to and from the contactless payment kiosk system. The software may include, for example, a network browser as well as other standard applications. The software may also include the ability, either automatically based upon a user request in another application, or by a user request, to search, or otherwise retrieve particular data from one or more remote points, such as on the Internet or from a limited or restricted database. The software may vary by user type or may be available to only a certain user type, depending on the needs of the system. Users may have some portions, or all of the application software resident on a local computing device, or may simply have linking mechanisms, as understood by those skilled in the art, to link a computing device to the software running on a central server via the communications network, for example. As such, any device having, or having access to, the software may be capable of uploading, or downloading, any information item or data collection item, or informational files to be associated with such files.

Presentation of data through the software may be in any sort and number of selectable formats. For example, a multi-layer format may be used, wherein additional information is available by viewing successively lower layers of presented information. Such layers may be made available by the use of drop-down menus, tabbed folder files, or other layering techniques understood by those skilled in the art or through a novel natural language interface as described herein throughout.

The contactless payment kiosk system software may also include standard reporting mechanisms, such as generating a printable receipt of the transaction, or an electronic results report that can be transmitted to any communicatively connected computing device, such as a generated email message or file attachment. Likewise, particular results of the system transaction can trigger an alert signal, such as the generation of an alert email, text or phone call, to alert a user, biller or person associated with the user or biller. Further embodiments of such mechanisms are described below and according to standards of such systems understood by those skilled in the art.

Embodiments of the system can include payors making remittances to payees, such as tenants making payments to landlords for rent payment. In certain embodiments, the system can dispense cash for applications like check cashing or micro loans. Thus, a biller can in certain embodiments by any entity receiving funds, or in other embodiments may be an entity distributing funds (for example a system partner that needs to dispense cash to a customer for refunds or any other type of compensation). In one embodiment, a contactless transaction system includes a kiosk comprising a token capture module. A controller is configured to communicate with the kiosk and a mobile device, the controller configured to receive a transaction instruction from the mobile device, generate a token for display on the mobile device corresponding to the transaction instruction, send the token to the mobile device, receive code data generated by the kiosk based on the token displayed on the mobile device, receive a transaction confirmation from the kiosk, and determine whether the transaction is complete based on the received code data generated by the kiosk and the transaction confirmation.

As shown in FIG. 2A, a contactless payment system can be configured as a cloud system 203, where payment services 201, an open API 202, atm/debit card processors 204, API services 205, a kiosk such as a smart ATM 206, a mobile device and application 207, and a desktop device and application 208 are in communication via the cloud system 203.

As shown in FIG. 2B an API can include an open API app 217, a $3^{rd}$ party API 218, an open API 219, a cloud API 219, a database 221, partner balances and access control 222, and a kiosk API 209. The kiosk API 209 can further include a kiosk browser 210, a clamshell 211, a camera agent 212, a cash acceptor agent 213, a printer agent 214, a cash dispenser agent 215 and a card reader agent 216.

As shown in FIG. 2C, the system can include a mobile device 250, a network 260, a kiosk device 270, and a financial service provider 280. The mobile device 250 can include a display 251 configured to display code data, a speaker 252 configured to produce a sound encoding code data, a transceiver configured to communicate with the kiosk device, and a network device 254 configured to communicate with the network 260. In some embodiments, an external input 255 is further included. The network 260 can include a remote server 261 and a database 262.

The kiosk device 270 can include a network device 271 configured to communicate with the network 260, a controller 272, a display 273, a transceiver 274 configured to communicate with the mobile device 250, a payment module 275, a token capture module 276, and a code input module 277 including a microphone 278 and/or and imaging device 279.

In some embodiments, the controller 272 can be configured to receive payment transaction instructions from the mobile device 250, generate a transaction code for display on the mobile device 250 corresponding to the payment transaction instructions, send the transaction code to the mobile device 250, receive code data generated by the kiosk of the transaction code displayed on the mobile device 250, receive a payment confirmation from the kiosk 270, and determine whether the transaction is complete based on the received code data generated by the kiosk 270 and the payment confirmation.

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C#, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Figure 3:
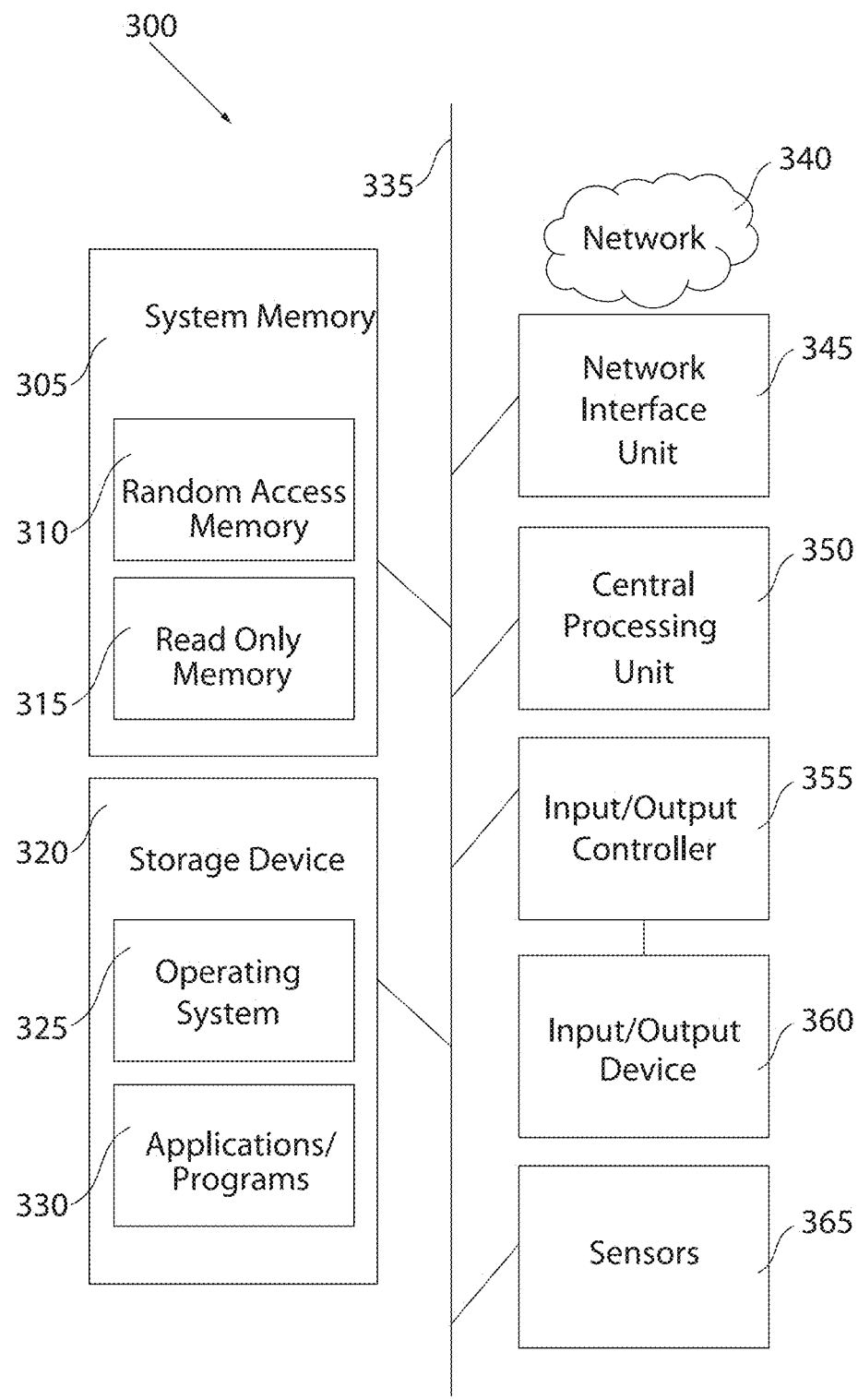
FIG. 3 is a block diagram depicting an exemplary computing system in accordance with some embodiments.

FIG. 3 and the following discussion are intended to provide a brief, general description of a suitable computing environment in which the invention may be implemented. While the invention is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 3 depicts an illustrative computer architecture for a computer 300 for practicing the various embodiments of the invention. The computer architecture shown in FIG. 3 illustrates a conventional personal computer, including a central processing unit 350 ("CPU"), a system memory 305, including a random-access memory 310 ("RAM") and a read-only memory ("ROM") 315, and a system bus 335 that couples the system memory 305 to the CPU 350. A basic input/output system containing the basic routines that help to transfer information between elements within the computer, such as during startup, is stored in the ROM 315. The computer 300 further includes a storage device 320 for storing an operating system 325, application/program 330, and data.

The storage device 320 is connected to the CPU 350 through a storage controller (not shown) connected to the bus 335. The storage device 320 and its associated computer-readable media, provide non-volatile storage for the computer 300. Although the description of computer-readable media contained herein refers to a storage device, such as a hard disk or CD-ROM drive, it should be appreciated by those skilled in the art that computer-readable media can be any available media that can be accessed by the computer 300.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information, and which can be accessed by the computer.

According to various embodiments of the invention, the computer 300 may operate in a networked environment using logical connections to remote computers through a network 340, such as TCP/IP network such as the Internet or an intranet. The computer 300 may connect to the network 340 through a network interface unit 345 connected to the bus 335. It should be appreciated that the network interface unit 345 may also be utilized to connect to other types of networks and remote computer systems.

The computer 300 may also include an input/output controller 355 for receiving and processing input from a plurality of input/output devices 360, including a keyboard, a mouse, a touchscreen, a camera, a microphone, a controller, a joystick, or other type of input device. Similarly, the input/output controller 355 may provide output to a display screen, a printer, a speaker, or other type of output device. The computer 300 can connect to the input/output device 360 via a wired connection including, but not limited to, fiber optic, ethernet, or copper wire or wireless means including, but not limited to, Bluetooth, Near-Field Communication (NFC), infrared, or other suitable wired or wireless connections.

As mentioned briefly above, a plurality of program modules and data files may be stored in the storage device 320 and RAM 310 of the computer 300, including an operating system 325 suitable for controlling the operation of a networked computer. The storage device 320 and RAM 310 may also store one or more applications/programs 330. In particular, the storage device 320 and RAM 310 may store an application/program 330 for providing a variety of functionalities to a user. For instance, the application/program 330 may comprise many types of programs such as a word processing application, a spreadsheet application, a desktop publishing application, a database application, a gaming application, internet browsing application, electronic mail application, messaging application, and the like. According to an embodiment of the present invention, the application/program 330 comprises a multiple functionality software application for providing word processing functionality, slide presentation functionality, spreadsheet functionality, database functionality and the like.

The computer 300 in some embodiments can include a variety of sensors 365 for monitoring the environment surrounding and the environment internal to the computer 300. These sensors 365 can include a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Figure 4B:
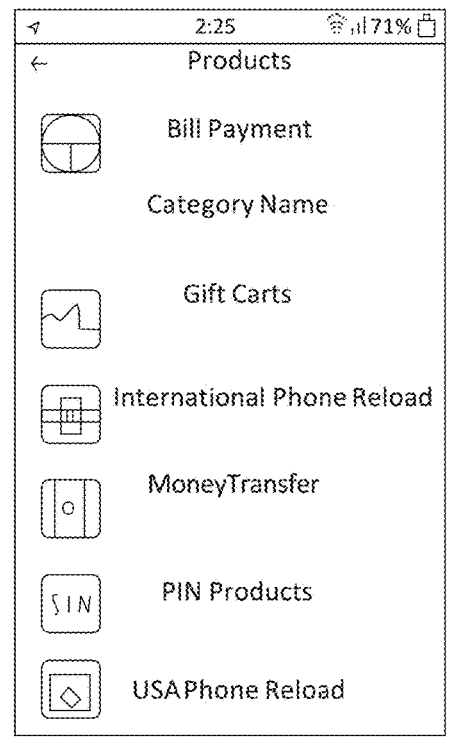
FIG. 4B is a flowchart depicting steps in a money transfer/bill payment transaction according to one example.
Figure 4B:
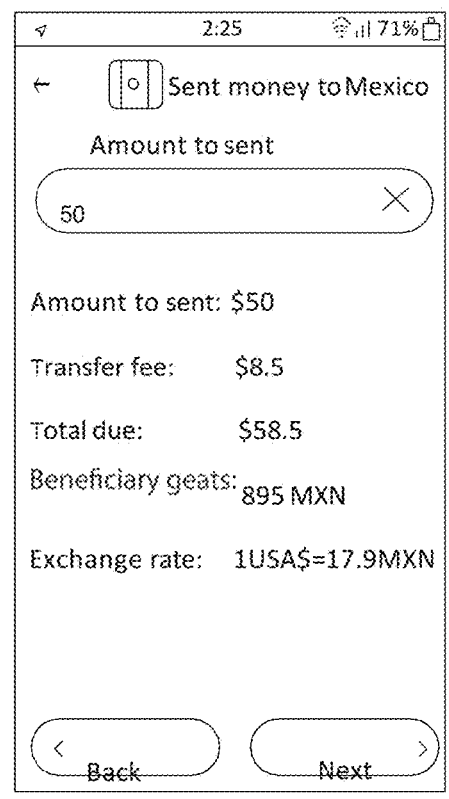
Figure 4C:
FIG. 4C is a flowchart depicting steps in a money transfer/bill payment transaction according to one example.
Figure 4C:
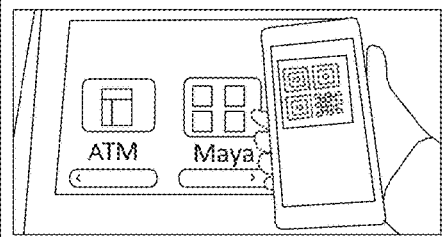
Figure 4C:
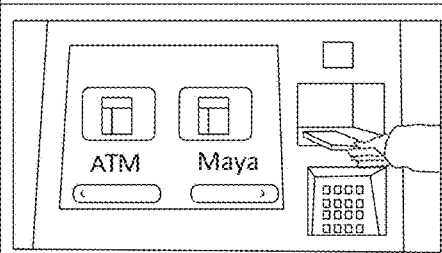
Figure 4D:
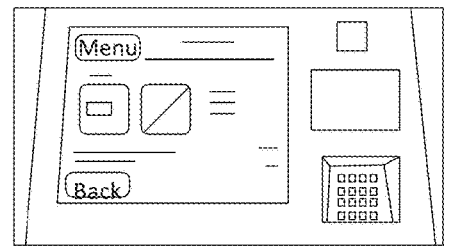
FIG. 4D is a flowchart depicting steps in a money transfer/bill payment transaction according to one example.
Figure 4D:
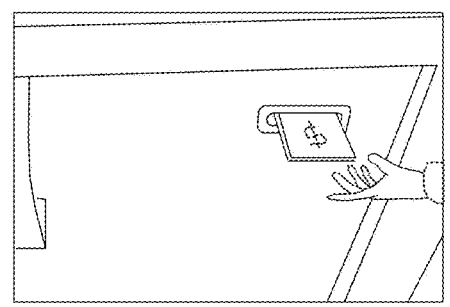
Figure 4D:
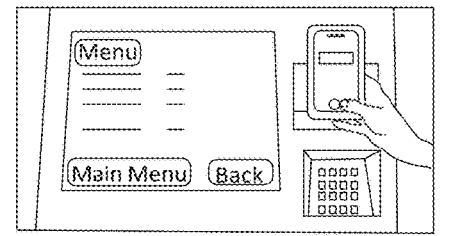
Figure 4E:
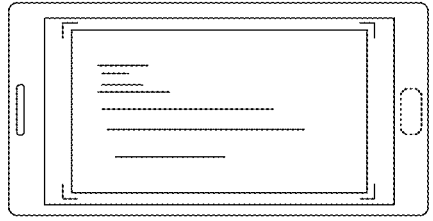
FIG. 4E is a flowchart depicting steps in a check cashing transaction example according to one example.
Figure 4E:
Figure 4E:
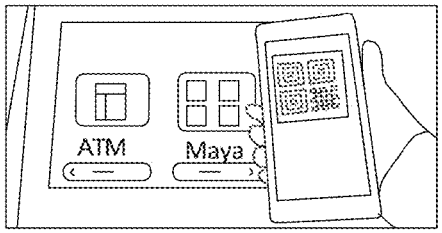

With reference now to FIGS. 4A-4D, according to one embodiment for money transfer and bill payment, a customer launches the cell phone app and logs in (Step 1). A customer is presented with the transactions he/she made before (Step 2). The screen shows that the customer sent money to Mexico and paid a cable bill. The customer can choose to make the payment again by clicking on an item in the "Payment history" box. Or the customer can make a new payment by clicking on the Products button to bring up the menu of services offered (Step 3). Next, the customer chooses the payment amount (Step 4). In the example below, the customer is sending $50 to Mexico. The payment appears in the shopping cart (Step 5). Next, the customer walks up to the kiosk and brings up the QR code by clicking on the QR code icon on the cell phone app (Step 6). The QR code reader on the kiosk reads the QR code on the cell phone app (Step 7), the kiosk prompts the customer to put cash in (Step 8), and the customer puts the cash into the kiosk (Step 9). Now, the transaction is complete (Step 10). The customer has a text receipt as well as the paper receipt from the kiosk. With reference now to FIGS. 4E and 4F, according to one embodiment for check cashing, a customer launches a cell phone app and takes a picture of the check (Step 1). The customer submits the check for verification. The check is reviewed by an automated system or by a human being (Step 2). If the check is approved, the customer gets the message shown on the phone. Next, the customer walks up to the kiosk to scan the QR code (Step 3). The customer is prompted to insert the check into the kiosk (Step 4). The customer then inserts the check into the kiosk (step 5). The software verifies the scanned check is the same check the customer got approved from the cell phone app. If the scanned check at the kiosk is the same check the customer submitted with his/her cell phone app, cash is dispensed (Step 6). If not, the check is rejected. Now the transaction is complete (Step 7). The customer gets a text receipt as well as the paper receipt from the kiosk.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention.

What is claimed is:

1. A contactless payment system comprising:
   a kiosk comprising a payment collection module and one or more token capture modules; and
   a controller configured to communicate with the kiosk and a mobile device, the controller configured to:
   receive a payment transaction instruction from the mobile device,
   generate a transaction code for display on the mobile device corresponding to the payment transaction instruction,
   send the transaction code to the mobile device,
   generate an image corresponding to the transaction code on a display of the mobile device,
   receive code data generated by the kiosk of the transaction code displayed on the mobile device by reading the image from the display of the mobile device via a display input module coupled to the kiosk,
   receive a payment confirmation from the kiosk, and
   determine whether the transaction is complete based on the received code data generated by the kiosk and the payment confirmation.

2. The contactless payment system of claim 1 wherein the controller comprises an application program interface (API) residing on a remote server.

3. The contactless payment system of claim 1, wherein the code input module is a scanner.

4. The contactless payment system of claim 1, wherein the code input module is an imaging device.

5. The contactless payment system of claim 4, wherein the imaging device is a camera.

6. The contactless payment system of claim 1, wherein the code input module is a microphone.

7. The contactless payment system of claim 1, wherein the payment collection module is a cash acceptor.

8. The contactless payment system of claim 1, wherein the payment transaction instruction comprises one or more of user data, payment amount data, biller data and invoice data.

9. The contactless payment system of claim 1, wherein the payment transaction instruction comprises all of user data, payment amount data, biller data and invoice data.

10. The contactless payment system of claim 1, wherein the transaction code displayed on the mobile device comprises a quick response (QR) code.

11. The contactless payment system of claim 1, wherein the transaction code displayed on the mobile device comprises an alphanumeric code.

12. The contactless payment system of claim 1, wherein the transaction code displayed on the mobile device comprises an audible code.

13. The contactless payment system of claim 1, wherein the transaction code displayed on the mobile device comprises a bar code.

14. The contactless payment system of claim 1, wherein the transaction code displayed on the mobile device is encoded in an image.

15. The contactless payment system of claim 1, wherein the transaction code displayed on the mobile device is encoded in a video.

16. The contactless payment system of claim 1 wherein the controller is configured to generate a receipt based on determining that the transaction is complete.

17. A method for contactless payment comprising:
  receiving a payment transaction instruction from a mobile device,
  generating a transaction code for display on the mobile device corresponding to the payment transaction instruction,
  sending the transaction code to the mobile device,
  generating an image corresponding to the transaction code on a display of the mobile device,
  receiving code data generated by a kiosk of the transaction code displayed on the mobile device by reading the image from the display of the mobile device via a display input module coupled to the kiosk,
  receiving a payment confirmation from the kiosk, and
  determining whether the transaction is complete based on the received code data generated by the kiosk and the payment confirmation.

18. The method of claim 17, wherein the code data is collected by a scanner.

19. The method of claim 17, wherein the code data is collected by an imaging device.

20. The method of claim 17, wherein the code data is collected by a camera.

21. The method of claim 17, wherein the code data is collected by a microphone.

22. The method of claim 17, wherein the payment confirmation is generated by one or more cash acceptor devices connected to the kiosk.

23. The method of claim 17 further comprising:
  generating a receipt to indicate that the transaction is complete.

\* \* \* \* \*